United States Patent [19]

Braceras et al.

[11] Patent Number: 5,557,768
[45] Date of Patent: Sep. 17, 1996

[54] FUNCTIONAL PIPELINED VIRTUAL MULTIPORT CACHE MEMORY WITH PLURAL ACCESS DURING A SINGLE CYCLE

[75] Inventors: George M. Braceras, Colchester, Vt.; Lawrence C. Howell, Jr., Austin, Tex.

[73] Assignee: International Business Machines Corporation, Armonk, N.Y.

[21] Appl. No.: 508,212

[22] Filed: Jul. 27, 1995

Related U.S. Application Data

[63] Continuation of Ser. No. 98,679, Jul. 28, 1993, abandoned.

[51] Int. Cl.$^6$ ................................................. G06F 12/08
[52] U.S. Cl. ........................ 395/458; 395/476; 395/467; 395/495
[58] Field of Search ...................... 364/200 MS file, 364/900 MS file; 395/467, 495, 458, 496, 457, 477, 476

[56] References Cited

U.S. PATENT DOCUMENTS

| | | | |
|---|---|---|---|
| 4,169,284 | 9/1979 | Hogan et al. | 395/425 |
| 4,240,144 | 12/1980 | Kindell et al. | 395/375 |
| 4,251,864 | 2/1981 | Kindell et al. | 395/425 |
| 4,298,929 | 11/1981 | Capozzi | 395/425 |
| 4,312,036 | 1/1982 | Porter et al. | 395/425 |
| 4,313,158 | 1/1982 | Porter et al. | 395/425 |
| 4,317,168 | 2/1982 | Messina et al. | 395/425 |
| 4,322,795 | 3/1982 | Lange et al. | 395/425 |
| 4,392,200 | 7/1983 | Arulpragasam et al. | 395/425 |
| 4,471,429 | 9/1984 | Porter et al. | 395/400 |
| 4,493,033 | 1/1985 | Ziegler et al. | 395/458 |
| 4,577,293 | 3/1986 | Matick et al. | 365/189.04 |
| 4,695,943 | 9/1987 | Keeley et al. | 395/425 |
| 4,766,535 | 8/1988 | Auerbach et al. | 395/492 |
| 4,785,395 | 11/1988 | Keeley | 395/425 |
| 4,794,521 | 12/1988 | Ziegler et al. | 395/457 |
| 4,814,976 | 3/1989 | Hansen et al. | 395/375 |
| 4,831,622 | 5/1989 | Porter et al. | 371/10.1 |
| 4,833,601 | 5/1989 | Barlow et al. | 395/425 |
| 4,860,197 | 8/1989 | Langendorf et al. | 395/375 |
| 4,888,689 | 12/1989 | Taylor et al. | 395/425 |
| 4,905,188 | 2/1990 | Chuang et al. | 395/425 |
| 4,916,604 | 4/1990 | Yamamoto et al. | 395/457 |
| 5,010,476 | 4/1991 | Davis | 395/325 |

(List continued on next page.)

FOREIGN PATENT DOCUMENTS

| | | |
|---|---|---|
| 0365281A2 | 4/1990 | European Pat. Off. . |
| 0432524A2 | 6/1991 | European Pat. Off. . |
| 0455230A2 | 11/1991 | European Pat. Off. . |
| 01-316849 | 12/1989 | Japan . |

OTHER PUBLICATIONS

*Intel's Pentium finally arrives, complete with local bus and multiprocessor chips,* EDN, v38, n7, p. 66(3), Mar. 31, 1993.
*Intel begins gradual P5 unveiling,* Microprocessor Report, v6, n12, p. 1(4), Sep. 16, 1992.
*Intel reveals Pentium implementation details,* Microprocessor Report, v7 n4, p. 9(9), Mar. 29, 1993.

(List continued on next page.)

*Primary Examiner*—Matthew M. Kim
*Attorney, Agent, or Firm*—Mark E. McBurney; Wayne P. Bailey

[57] ABSTRACT

A virtual triple ported cache operates as a true triple ported array by using a pipelined array design. Multiple execution units can access the cache during the same cycle that the cache is updated from a main memory. The pipelined features of the cache allow for three separate sequential operations to occur within a single cycle, and thus give the appearance of a virtual triple ported array. This virtual triple port array architecture contains a data interface for dual execution units, which allows both units to access the same data array location. The array architecture allows for back-to-back read accesses occurring within a half cycle. The array architecture provides a bypassing function around the array for a write occurring on one port to the same address that a read is occurring on the other port. To allow for simultaneous cache reloads during execution unit access, a late write is done at the end of the cycle.

18 Claims, 5 Drawing Sheets

U.S. PATENT DOCUMENTS

| | | | |
|---|---|---|---|
| 5,051,894 | 9/1991 | Phillips et al. | 395/400 |
| 5,056,002 | 10/1991 | Watanabe | 395/425 |
| 5,056,041 | 10/1991 | Guttag et al. | 395/164 |
| 5,058,116 | 10/1991 | Chao et al. | 371/40.2 |
| 5,060,145 | 10/1991 | Scheuneman et al. | 395/425 |
| 5,155,843 | 10/1992 | Stamm et al. | 395/575 |
| 5,247,649 | 9/1993 | Bandoh | 395/457 |
| 5,274,790 | 12/1993 | Suzuki | 395/460 |
| 5,287,480 | 2/1994 | Wahr | 395/458 |

OTHER PUBLICATIONS

Bursky, RISC chip set adorned with high performance, many features, Electronic Design, vol. 36, No. 10, p. 39(3).

"Improved Data Cache Reload Performance", IBM Technical Disclosure Bulletin, vol. 32, No. 4B, 9/89. pp. 244–245.

"Transparent Cache Reload Buffer Design", IBM Technical Disclosure Bulletin, vol. 32, No. 12, 5/90, pp. 291–293.

"Cache Error Handling in a Store–in–Cache Design", IBM Technical Disclosure Bulletin, No. vol. 20, No. 9, 2/78, pp. 3585–3586.

"Boundary Crossing Within A Cache Line", IBM Technical Disclosure Bulletin, vol. 25, No. 7A, 12/82, pp. 3539–3542.

"Cache Enhancement for Store Multiple Instruction", IBM Technical Disclosure Bulletin, vol. 27, No. 7A, 12/84. pp. 3943–3944.

"Cache Addressing to Minimize Off–Boundary Breakage", IBM Technical Disclosure Bulletin, vol. 27, No. 8 1/85. pp. 4781–4784.

"Fast Packet Bus for Microprocessor Systems with Caches", IBM Technical Disclosure Bulletin, vol. 31, No. 8, 1/89. pp. 279–282.

"Efficient Handling of Storage Operands That Cross Page Boundaries", IBM Technical Disclosure Bulletin, vol. 33, No. 4, 9/90, pp. 275–277.

"Split Cache With Variable Interleave Boundary", IBM Technical Disclosure Bulletin, vol. 22, No. 11, 4/80, pp. 5183–5186.

"Prefetch Cache for Data Search with Limited Multiple––Porting", IBM Technical Disclosure Bulletin, vol. 27, No. 7A, 12/84, 4028–4030.

"Cache Concurrent Processing", IBM Technical Disclosure Bulletin, vol. 29, No. 10, 3/87, p. 4279.

"Improved Cost, Performance, and Reliability by Simultaneous Accesses to Pipelined Caches with Duplicate Data Protection and Enhanced Multiprocessor Performance", IBM Technical Disclosure Bulletin, vol. 33, No. 1A, 6/90, pp. 264–265.

"Odd/Even Interleave Cache with Optimal Hardware Array Cost, cycle Time and Variable Data Port Width", IBM Technical Disclosure Bulletin, vol. 23, No. 7B, 12/80, pp. 3461–3463.

"Reducing Instruction Cache Reload Latency", IBM Technical Disclosure Bulletin, vol. 32, No. 4B, 9/89. p. 229.

FUNCTIONAL PIPELINED VIRTUAL MULTIPORT CACHE MEMORY WITH PLURAL ACCESS DURING A SINGLE CYCLE

This is a continuation of application Ser. No. 08/098,679 filed Jul. 28, 1993, now abandoned.

TECHNICAL FIELD

This invention relates to the field of data processing systems, and more particularly to a cache memory allowing for concurrent access from multiple sources.

BACKGROUND OF THE INVENTION

Improving the performance of data processing systems is a never ending quest. One technique used to increase system performance is to perform certain operations in parallel, as opposed to serially. This allows for performing more than one operation at any given time. Some processors contain a plurality of execution units so that more than one instruction can be executed at a given time. Superscaler computers are an example of this type of architecture, where multiple instructions are simultaneously dispatched to multiple execution units for parallel execution.

Caches are high speed memory arrays used to store instructions or data that are required by a processor or execution unit within the processor. The cache resides between the processor and slower, main memory. By maintaining instructions and/or data in the cache, the processor is able to access such instructions and/or data faster than access to the main memory.

The use of multiple execution units presents a problem of how to allow each execution unit access to a single cache. Although providing separate caches to each execution would eliminate this problem, this solution increases system cost by requiring the addition of another cache array. This also results in added system complexity and redundancy, in that each execution unit is no longer sharing a common cache or executing a common instruction/data stream. Rather, the execution units are operating autonomously from one another.

One approach to allowing multiple accesses to a cache in a system having two execution units is to design a cache array which is a dual port cache. Thus, each processor would have its own interface to the cache. However, there are distinct disadvantages with this approach, since a dual port array requires 30–50% more physical area than a single port array. The dual port array also has slower access times.

Besides the processor interface requirements, another factor which must be considered in cache design is the interface to the main memory. A line of data, which consists of several cycles of data transfers, must be fetched from memory and written into the cache. However, this operation will interrupt accesses from the processor in either a single or dual port design. One approach to avoid interrupting the processor is to hold off one of the execution units until the reload is completed, but this hampers processor performance.

An approach which allows for cache access by the processor and still allows for concurrent cache reloads is to add a cache reload buffer, outside of the cache array, to store the memory line. This technique is described in U.S. Pat. No. 4,905,188 entitled "Functional Cache Memory Chip Architecture for Improved Cache Access", and hereby incorporated by reference. However, this approach is very costly in terms of physical space and complexity, including a line's worth of registers for data storage, multiplexors on the input and output paths, and the associated control logic to read and write a separate area outside of the array. A cache reload buffer also requires a cycle to transfer its contents into the cache array.

It might be advantageous to create a cache array design that created a triple ported array cell. A triple port could allow for each processor to have access via a port, and the cache would also have a port for accessing main memory during a cache reload. However, a true triple ported array cell would have inherent complexities and physical space requirements.

SUMMARY OF THE INVENTION

The present invention allows for accessing a cache from multiple processors, while allowing a cache reload to occur in parallel. A virtual triple ported array appears to operate as a true triple ported array, without the inherent space requirements and speed limitations of a true triple ported array. This is achieved by using a pipelined array design. In this design, the array storage cells are accessed three times within a cycle and give the appearance of a virtual triple ported array. This array contains the maximum array density since a simple single port random access memory (RAM) cell design is used.

This virtual triple port array architecture is built upon a pipelined array, and contains a data interface for dual execution, units which allows both units to access the same data array location. The array architecture allows for back-to-back read accesses occurring within a half cycle. The array architecture provides a bypassing function around the array for a write occurring on one port to the same address that a read is occurring on the other port. To allow for simultaneous cache reloads during execution unit access, a late write is done at the end of the cycle, By understanding the features which are needed in a system requiring a cache and coupling them with a standard array design, the array peripheral logic has been modified to produce an integrated design with minimal additional logic.

It is therefore an object of the present invention to provide for an improved data processing system.

It is a further object of the present invention to provide an improved data processing system cache.

It is yet a further object of the present invention to improve the performance of a data processing system using an improved cache design.

It is still another object of the present invention to provide a cache design that logically appears as a triple ported array.

It is yet another object of the present invention to implement a pipelined cache array.

These, and other, objects and features of the present invention will now be shown, with reference to the following drawing, in which:

DETAILED DESCRIPTION OF THE PREFERRED EMBODIMENT

Figure 1:
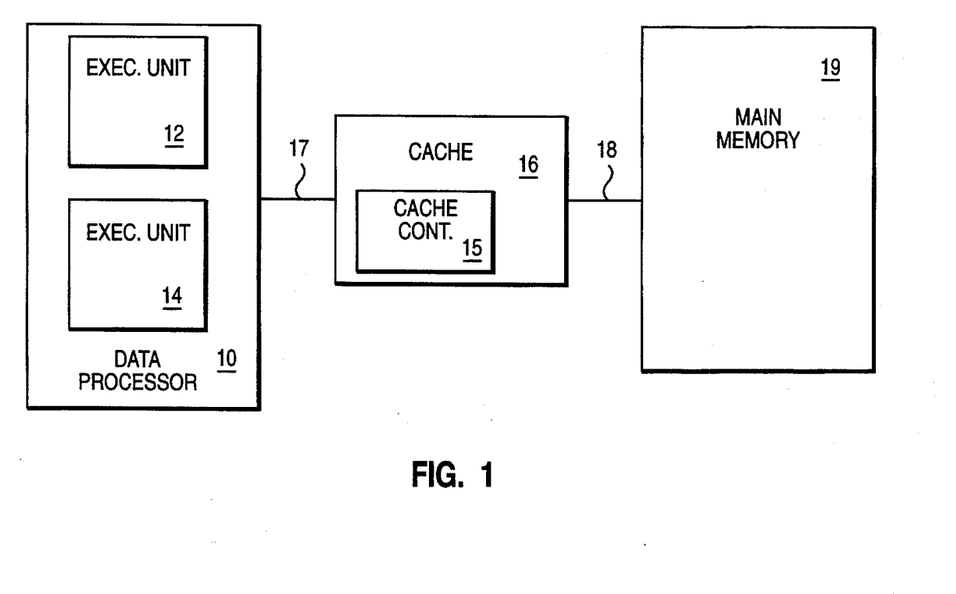
FIG. 1 shows the cache interface to a processor and main memory.

Referring to FIG. 1, a data processor 10 contains two execution units 12 and 14 which have the ability to function independently. Each of the two execution units can perform a read (load) or write (store) operation within a cycle. It is even possible for each execution unit to access the same location within the cache during a cycle. In a similar manner using the techniques described below, the execution units 12 and 14 could be separate processors in a multi-processor environment, accessing a common cache. The cache 16 described hereinafter allows for simultaneous access of the cache at 17 by the two execution units/processors 12 and 14. The cache 16 also has an interface 18 to main memory 19, for reading/writing data to/from the cache from/to main memory. The cache 16 also comprises a cache controller 15, for controlling the data flow within the cache. The pipelined features of the cache allow for three separate sequential operations to occur within a single cycle.

Figure 2:
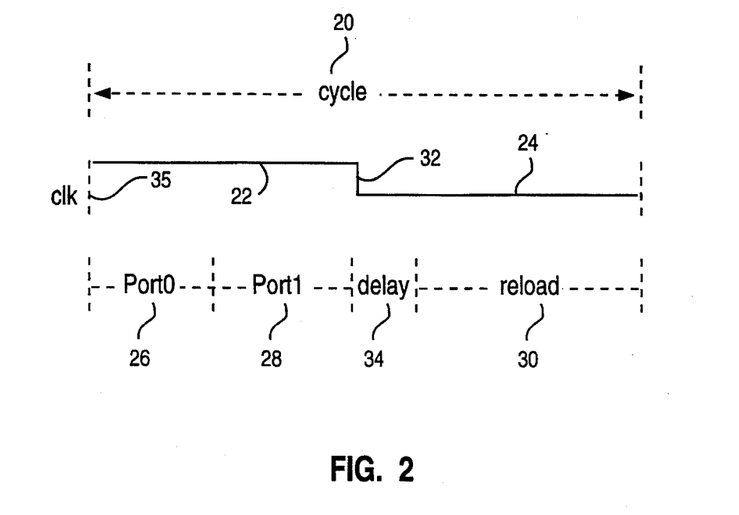
FIG. 2 depicts the pipelined array's operations that occur in a single cycle.

Referring to FIG. 2, a single cycle 20 of the D-CLK is composed of two half cycles 22 and 24. The first half cycle 22 is broken into two portions 26 and 28. The operation performed during the first portion 26 of the first half cycle 22 is normally dedicated to Port0. The operation performed during the second portion 28 of the first half cycle 22 is for Port1. The last operation which occurs within the single cycle 20 is dedicated to reloading data from memory at 30.

The exception to this sequential ordering occurs when Port1 is performing a read and Port0 a write. In this situation, Port1's read will occur first, followed by Port0's write. That is, a read operation on one Port will always preclude a write on the other port. The port reordering is important because the array cell's recharge time required after a write operation would delay the following read operation, thereby resulting in the execution unit getting the read data too late in the cycle.

However, the read-before-write situation can create a problem when Port0 and Port1 refer to the same element within the array. If the read occurs first, then the port requesting it will not have the most current data which is contained on the write port. Therefore, a bypass multiplexor is provided for each of the output ports, with one input being the array and the other input being the input data for the opposite port. The bypass input data will then be chosen when the addresses collide for a read and a write. If both ports are performing write operations to the same address, the net effect will be that Port1's data will be left in the array, thus making it the priority port.

The last operation performed in the cycle 20 is the writing into the cache array of the data fetched from memory. The timing is based upon the falling edge 32 of the chip clock, plus a delay 35. Using the falling edge instead of a internally generated array clock avoids the possibility of a race condition between the array internal clock and the cache reload data which is launched on the preceding rising edge 35. The delay can be adjusted so that the write can occur later than halfway through the cycle if more time is needed. For instance, the cache reload input data that is stored in the memory latches may go through error checking and correction logic (ecc) which can take slightly more than a half cycle before it is ready for the cache array.

Figure 3:
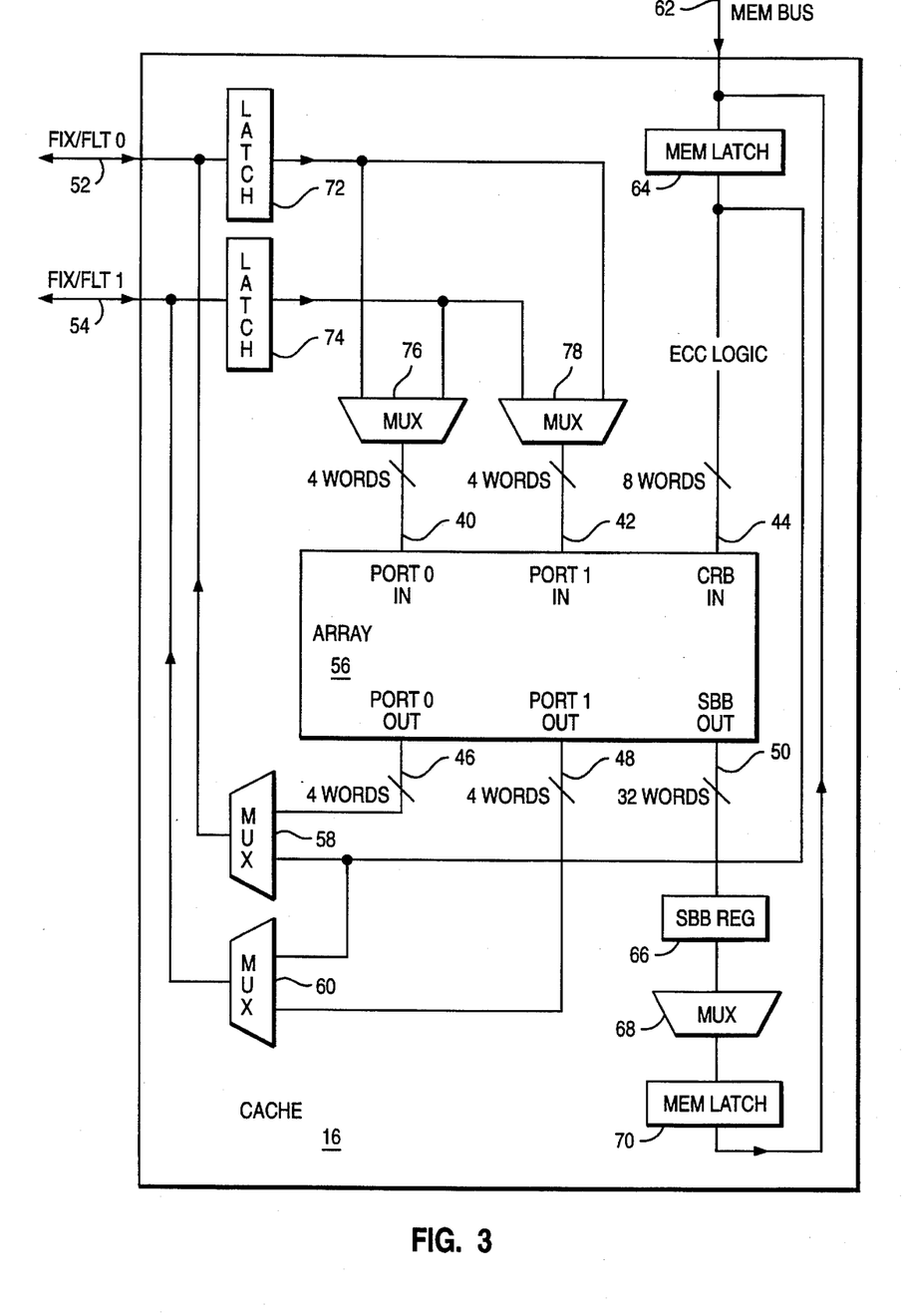
FIG. 3 depicts the overall block diagram of the virtual triple ported cache array.

A high level dataflow of the cache is shown in FIG. 3. There are three input ports: Port0 at 40, Port1 at 42, and Cache Reload Buffer (CRB) at 44, with each having its associated addresses and set-ids (further depicted in FIG. 5).

There are two data output ports, Port0 at 46 and Port1 at 48, which are the data path for outputting data from the array. The data value output is from the location specified on the respective port's address bus (80 and 82 of FIG. 5). The Store Back Buffer (SBB) Port at 50 can use either the address and setid for Port0 or Port1.

There are two external ports 52 and 54 on the cache chip 16, one for each execution unit (the fixed and floating point execution units), which will be referred to as FIX/FLT0 and FIX/FLT1. Each of these ports include their corresponding address, controls, and input and output busses. A read or write operation can occur on each of the ports. If a read occurs, then data is read from the array 56 for the corresponding address. If a write occurs, then data is written into the array 56 for the corresponding address.

The operation of each port occurs sequentially within a cycle. Normally Port0's operation is performed first, followed by Port1's operation. The sequential ordering of operations, however can create a problem when both ports refer to the same element within the array 56. If the read occurs first, then the execution unit requesting the read will not have the most current data. For the two writes occurring at the same time, a priority scheme must be established to know which port's data should be kept in the array.

The following logic in Table 1 covers each of the possible scenarios for the combination of operations which can occur between the ports.

TABLE 1

If a read is occurring on both ports then two separate reads occur.
If a write is occurring on both ports then Port0 can be written into the array followed by Port1's write (Note that if the address is the same for both Ports, only Port1's data is retained in the array which thereby establishes Port1 as the priority port).
A write on one of the ports and a read on the other requires the additional logic shown as follows:
If Port0 is a write operation & Port1 is a read operation
    then
        write Port0 input into the array
        bypass Port0 input to Port1 output if addresses compare
If Port1 is a write operation & Port0 is a read operation
    then
        write Port1 input into the array
        bypass Port1 input to Port0 output if addresses compare An alternative to the write/read scenario shown above is to allow the write to occur, followed by the read from the array; as shown below in Table 2.

TABLE 2

If Port0 is a write operation & Port1 is a read operation
    then
        write Port0 input into the array
        then
            read from array to Port1 output
If Port1 is a write operation & Port0 is a read operation
    then
        write Port1 input into the array
        then
            read from array to Port0 output The first read/write scenario allows the bypassing function (further described below with reference to FIG. 4) to be done in parallel with the write. Therefore, the data is placed on the output port sooner than the second scenario. The second scenario, however, is much easier to implement since the bypass function (which must compare addresses, sets, late-selects) never needs to be considered.

By reordering the operations as described above, the cache array can be simultaneously accessed by multiple execution units or processors.

A load through path is provide using multiplexors 58 and 60, where the output of Port0 and Port 1 is multiplexed with data from the memory bus 62 that has been latched at 64. This allows data to be provided, directly from the memory bus, through the cache, to the execution units through buses 52 and 54 (a load through operation). Also shown in FIG. 3 are the cache-reload buffer input port 44, where data from the memory bus 62 is loaded into the cache, and the store back buffer output port 50, where data output from the cache is written to main memory via memory bus 62. For the store back buffer function, there is a multiplexor 68 which selects appropriate values from the SBB Reg 66. The SBB Reg contains data for an entire line of data, which is 64 words in the preferred embodiment. Since the memory bus 62 is only 8 words wide, the muliplexor 68 is used to provide latch 70 with 8 words at any given time. Since there are 8 groups of 8 words (8×8=64 words), the multiplexor uses 8 cycles to pass all values from the SBB Reg 66 to the main memory across memory bus 62.

Finally in regards to FIG. 3, the data supplied from the two processing units (fixed and floating point) via busses 52 and 54 are latched at 72 and 74. The values from either processing unit can then be directed to either Port0 In 40 or Port1 In 42 using multiplexors 76 and 78.

Figure 4:
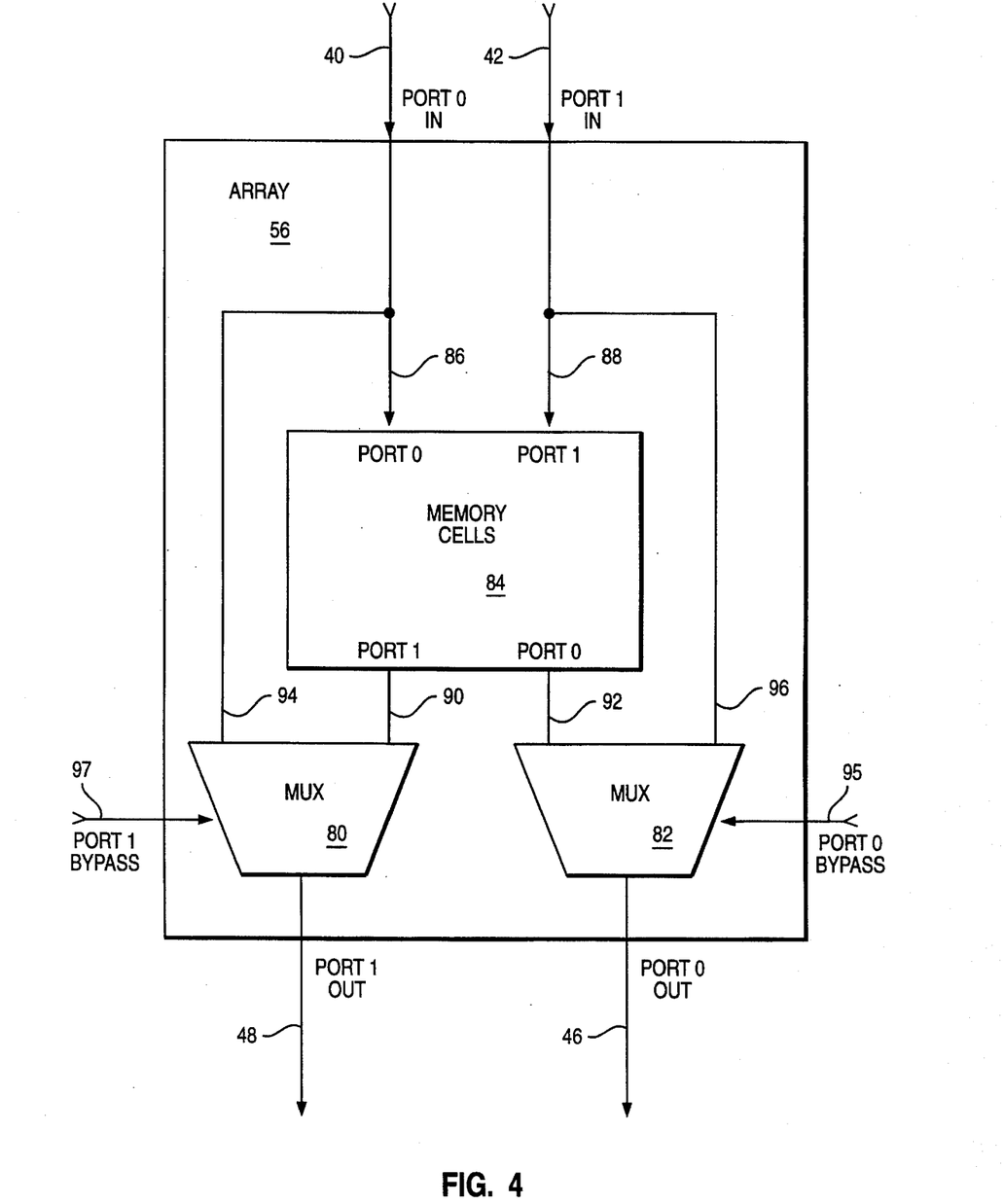
FIG. 4 depicts internal multiplexing within a cache array.

FIG. 4 shows the bypass function in greater detail. A bypass operation can occur when a write operation occurs on one port and a read operation on the other port. Bypass is needed when there is a read/write address conflict between the two processors, where each processor is trying to access the same location. Inside the array 56 are two multiplexors 80 and 82, and memory cells 84. In the normal write operation (i.e. no bypass), data comes in from Port 0 In 40 and Port 1 In 42, and continues to the respective input ports 86 and 88 of the memory cells 84. In a normal read operation, data is read from the appropriate memory cells 84 and output through the appropriate Port 0 92 or Port 1 90. In the bypass mode of operation, data input from Port 0 In 40 bypasses memory cells 84, and is directly supplied to Port 1 Out 48 via path 94 through multiplexor 80. In a similar manner, data input from Port 1 In 42 bypasses memory cells 84, and is directly supplied to Port 0 Out 46 via path 96 through multplexor 82. Thus, a bypass is provided such that data being written to Port 0 can be immediately read on Port 1. Likewise, data being written to Port 1 can be immediately read on Port 0. The controls signals Port0 Bypass 95 and Port1 Bypass 97 are generated as follows. If the address of the writing port is equal to the address of the reading port, and the SetID of the writing port is equal to the SetID chosen by the reading port's Late Selects (94 and 96 of FIG. 5), then the bypass signal for the reading port is enabled.

Figure 5:
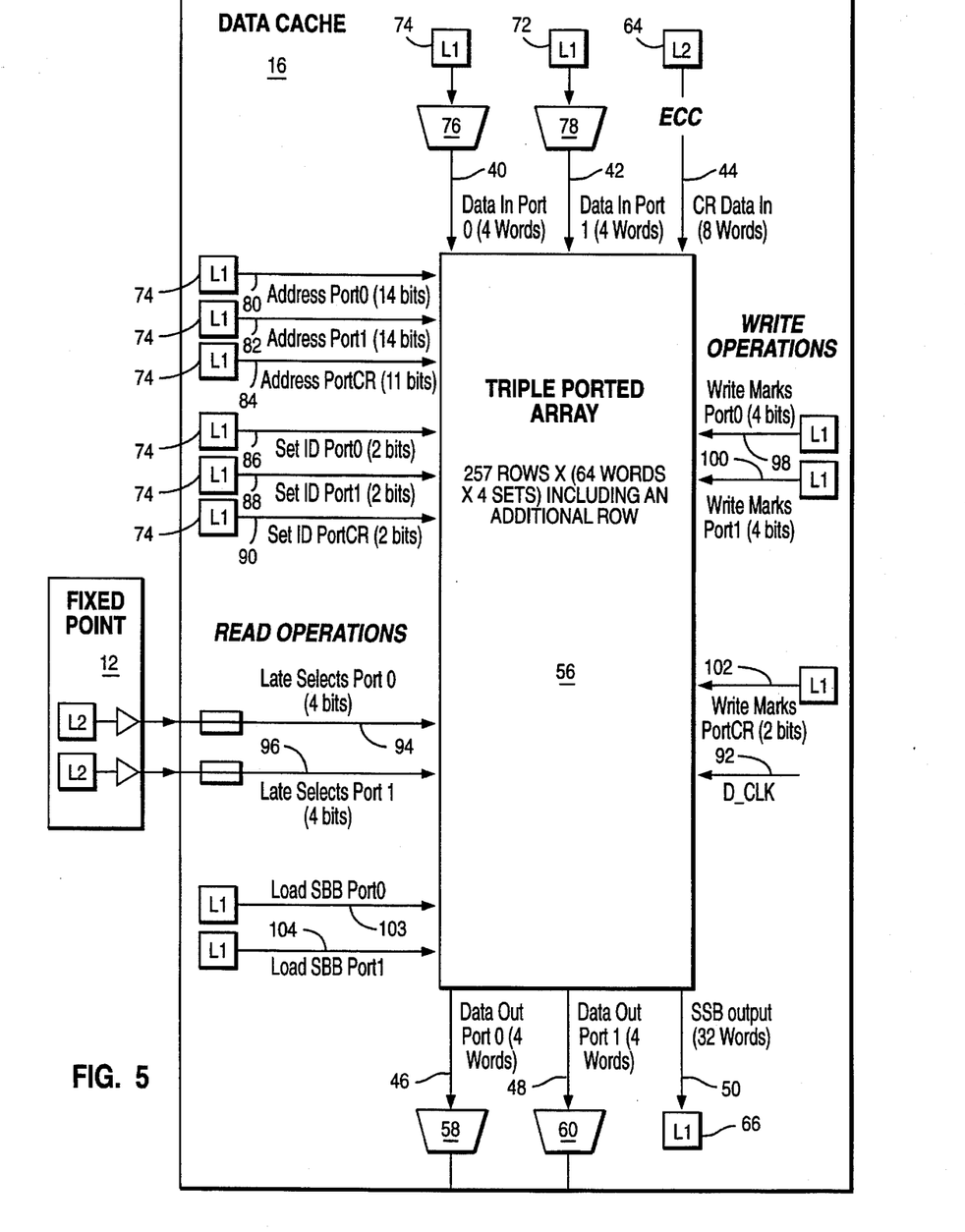
FIG. 5 shows the detailed interfaces for the cache.

The array control and data interfaces are shown in detail in FIG. 5. The specific operations which can be performed using the addresses, set-ids and late selects for Port0 and Port1 are (i) a word read, (ii) a 1–4 byte write, (iii) a cache reload, (iv) a cache load through, and (v) line store back.

Referring to FIG. 5, the addresses for Port 0, Port 1, and Port CR are shown at 80, 82 and 84 respectively. These addresses are generated by the execution units/processors that need access to the cache array 56. The addresses are latched at 74. L1 represents data which was sent or generated the previous cycle and is presently latched. As will be discussed further below, L2 represents data which is sent or generated during the current cycle. The SetID inputs for PortO, Port1, and PortCR, shown respectively at 86, 88, and 90, are used to select the appropriate set within array 56. In the preferred embodiment, a four-way set associativity is used, and thus 2 bits are needed to select one of the four set values associated with a given address. Thus, each input port Port0 40, Port1 42, and Port CR 44, has a two bit SetID value at 86, 88 and 90, respectively. Set associativity is commonly known in the art, as exemplified by U.S. Pat. No. 5,014,19S and hereby incorporated by reference.

The D_CLK input 92 is the data clock, a single cycle of which is shown in FIG. 2. This is a standard clock signal used to synchronize the reading and writing of data out of and into the array 56. The read, write, reload, load through, and store back operations will now be described, still with reference to FIG. 5.

Read Operation

The word read operation uses a late select scheme where the congruence class address is sent the cycle before, as indicated by the L1 values at 80 and 82. If a "hit" occurs in the cache, the late select is sent during the current cycle, as indicated by the L2 values sent at 94 and 96. For read operations, the SetID values are not used to select a particular set. Instead, all four respective words from each set are read out from memory cells 84 of FIG. 4. The desired four word value is then gated to the output of array 56 using the late select values at 94 or 96 (depending on whether reading from Port 0 or Port 1). In the preferred embodiment, there are four separate select bits (i.e. the bits are not encoded) for a given port,, so that the selection of a given four word set value is accomplished by merely ANDing the set values with the respective late select bit value. Because the selection is occurring late, there is a need to perform the selection as quickly as possible, and thus with as few gate delays as possible. Therefore, there is no encoding of the late select bits which would require subsequent decoding prior to selecting the desired set.

Write Operation

The input paths into the array are a quad.-word wide. The array can have 1–4 words written into it based upon whether its associated write mark is exerted. There are four write marks bits for each of Port0 and Port1, shown at 98 and 100, respectively. Each of the bits represents a single word within the four-word group which is presented at Port0 In 40 or Port1 In 42. If the Write Mark bit is active, its associated word at the input port is written into the array 56.

Cache Reload Operation

Figure 6:
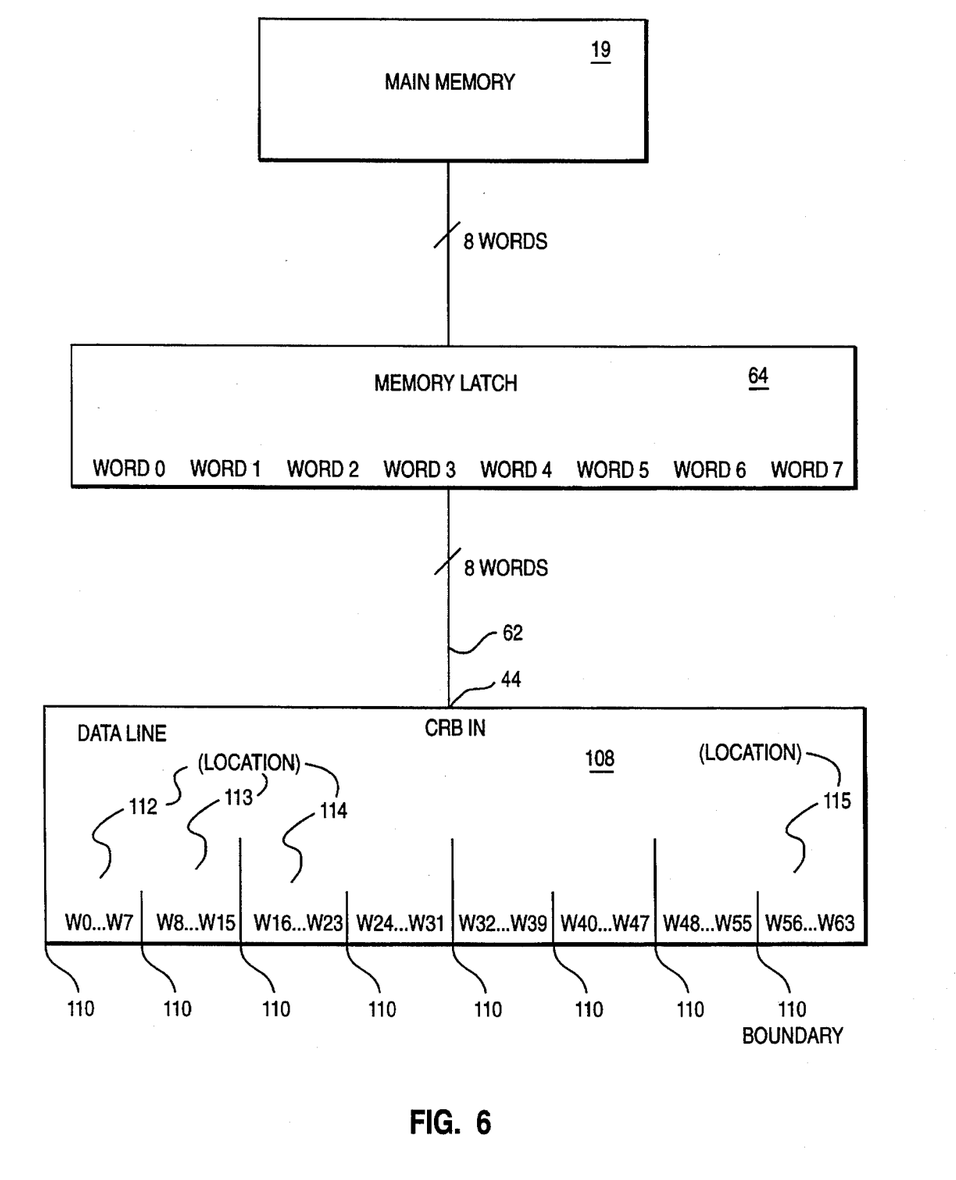
FIG. 6 shows 8-word boundaries within a cache line.

The cache reload function is performed at the end of the cycle (see 30 of FIG. 2). An 8-word interface at 62, between main memory and the cache 16, was designed with two cache reload mark bits at 102. If the first mark is exerted then the first 4-words are written into the array with the second mark corresponding to the second 4-words. Using the marks in this manner allows the array to be used with a 4 or 8-word memory bus. The write operation is straightforward, using common techniques, and is aligned on 8-word boundaries. The cache reload has its own input and address busses at 44 and 84, respectively, as well as its own SetIDs at 90. The address and SetID of the reload is initially sent by the execution unit, and points to the beginning of an 8 word boundary. Since 8-word boundaries are being addressed, only 11 address bits are needed. Referring to FIG. 6, a line of data within array 56 (FIG. 5) to be reloaded is shown at 108. The line of data is logically organized as 8 groups of 8 words. Since the interface 62 between the array 56 and main memory is 8 words, data must be transferred 8 words at a time. A line's worth of words (64 words in the preferred embodiment) to be transferred from main memory into the array begins on any 8-word boundary 110. Eight words are transferred per cycle, since this is an 8-word interface. The initial 8-word boundary address, as specified by the address and SetID values presented to the cache at 84 and 90, is incremented within the cache chip after each 8-word transfer from memory. The address increment is achieved using a standard 3-bit counter which counts from 0–7. This counter points to a particular 8-word boundary. By using the internal counter, an automatic wrap-around is achieved. For instance, if the first 8-word group of the line to be transferred was located at 114, subsequent transfers would be sequentially filled within the line up to and including the 8-word group filled in at 115. The counter would then wrap to 0, such that the next 8-word group transferred from main memory 19 across interface 62 would be stored at 112, followed by the last (8th) 8-word group being stored at 113. A full line of data is transferred in 8 cycles, as 8-words are transferred per cycle and the line is 64 words. By also using the Write Marks for PortCR 102, the data transfer can start on any 4 or 8-word boundary, using commonly know techniques of aligned/unaligned cache access as exemplified by EP 0365-281, hereby incorporated by reference.

Since the data is now contained in the array, the processor can access it the very next cycle. The processor doesn't need to keep track of a separate cache reload buffer or to wait until the whole memory line is reloaded before accessing the array. There is no conflict between execution unit access and cache reload since the former occurs during the first portion of the clock cycle, whereas the latter occurs during the second portion of the clock cycle.

Other items that are also included in this design are a load through path from memory to the execution unit busses and a separate Store Back Buffer for sending data to memory.

Load Through Operation

The load through path, as previously described above, has the ability to immediately access data that has been sent from memory and is currently stored in the memory latches 64 (FIG. 3). Since the read/write access occurs during the first portion of the clock cycle, it is possible that the data to be accessed is currently be reloaded in the second portion of the clock cycle. For example, if an 8-word group of data is being reloaded into the array during the second portion of the cycle, and an execution unit attempts to access this same location with a read during the first half of the cycle, the execution would be reading stale data. The load through function allows for the 8-word group of data that is to be reloaded into the array during the second portion of the clock cycle (from latch 64) to be immediately made available to the execution units at 52 and 54. Thus, the execution unit/processor has the ability to access any part of the line during any of the transfer cycles. This allows data to be sent to the processors/executions units as soon as the cache chip 16 receives it. The data is only needed to be accessed using the load through operation for one cycle, since it will be contained in the array the next cycle.

Store Back Operation

The last operation which can occur is the Store Back Function. Either Port0's or Port1's address 80 or 82 and SetIDs 86 and 88 can be used. Whether to use the values for Port0 or Port1 is determined by which Load SBB input is activated at 103 and 104. Activating one of these inputs 103 or 104 to select which address and SetID to use also initiates the Store Back Operation. The data for the half line (32 bytes) of the row specified for the specified address will be placed on the SBB output port 50, and stored in SBB Reg 66 (FIG. 3). A half line is used for two reasons. The first is that a tremendous power surge is required to access a line worth of data. The second reason is to limit the number of outputs with their associated wiring congestion. It was also deemed that a store back operation can normally be performed at non-critical times and the two cycles to remove a line would not result in a performance penalty. The SBB Reg values are then transferred to memory using multiplexor 68 and latch 70 of FIG. 3, as previously described.

In conclusion, this cache architecture has numerous features which improve system performance, as well as simplifying accesses without adding substantial external logic.

We claim:

1. A method for operating a cache to interface a memory with a plurality of data processors, said cache providing concurrent operations to said memory and said plurality of processors, said method comprising the steps of:

accessing said cache by a first processor and a second processor during a first portion of a clock cycle wherein said cache is accessed a plurality of times during said first portion of said clock cycle; and accessing said cache by said memory during a second portion of said clock cycle, wherein said first and second processor and said memory all concurrently access said cache in a single clock cycle.

2. The method according to claim 1, further comprising the steps of:

determining whether said first and second processor are accessing an identical location in said cache;

determining if said first processor is performing a read operation and said second processor is performing a write operation; and writing information from said first processor to said location in said cache before said second processor reads information from said location in said cache.

3. The method according to claim 2 wherein said access of said cache by said memory occurs based on a falling edge of said clock cycle.

4. The method according to claim 3 wherein said first and second processors access said cache sequentially during said first portion of said clock cycle.

5. The method according to claim 4 wherein said clock cycle is comprised of a first half cycle and a second half cycle, and wherein said access by said first and second processor occur within said first half cycle and said access by said memory occurs within said second half cycle.

6. The method according to claim 1, further comprising the steps of:

determining if said first and second processor are accessing an identical location in said cache;

determining if said first processor is performing a read operation and said second processor is performing a write operation; and bypassing said cache and providing information directly from said first processor to said second processor.

7. The method according to claim 6 wherein said access of said cache by said memory occurs based on a falling edge of said clock cycle.

8. The method according to claim 7 wherein said first and second processors access said cache sequentially during said first portion of said clock cycle.

9. The method according to claim 8 wherein said clock cycle is comprised of a first half cycle and a second half cycle, and wherein said access by said first and second processor occur within said first half cycle and said access by said memory occurs within said second half cycle.

10. The method according to claim 8 wherein said clock cycle is comprised of a first half cycle and a second half cycle, and wherein said access by said first and second processor occur within said first half cycle and said access by said memory occurs within said second half cycle.

11. A data processing system including a cache for interfacing a memory with a plurality of data processors, said cache providing concurrent operations to said memory and said plurality of processors, said cache comprising:

means for accessing said cache by a first processor and a second processor during a first portion of a clock cycle wherein said cache is accessed a plurality of times during said first portion of said clock cycle; and means for accessing said cache by said memory during a second portion of said clock cycle, wherein said first and second processor and said memory all concurrently access said cache in a single clock cycle.

12. The system according to claim 11, further comprising:

means for determining whether said first and second processor are accessing an identical location in said cache;

means for determining if said first processor is performing a read operation and said second processor is performing a write operation; and means for writing information from said first processor to said location in said cache before said second processor reads information from said location in said cache.

13. The system according to claim 12 wherein said access of said cache by said memory occurs based on a falling edge of said clock cycle.

14. The system according to claim 13 wherein said first and second processors access said cache sequentially during said first portion of said clock cycle.

15. The system according to claim 14 wherein said clock cycle is comprised of a first half cycle and a second half cycle, and wherein said access by said first and second processor occur within said first half cycle and said access by said memory occurs within said second half cycle.

16. The system according to claim 11, further comprising:

means for determining if said first and second processor are accessing an identical location in said cache;

means for determining if said first processor is performing a read operation and said second processor is performing a write operation; and means for bypassing said cache and providing information directly from said first processor to said second processor.

17. The system according to claim 16 wherein said access of said cache by said memory occurs based on a falling edge of said clock cycle.

18. The system according to claim 17 wherein said first and second processors access said cache sequentially during said first portion of said clock cycle.

* * * * *